(12) United States Patent
Biswas et al.

(10) Patent No.: US 11,734,582 B2
(45) Date of Patent: Aug. 22, 2023

(54) AUTOMATED RULE GENERATION FRAMEWORK USING MACHINE LEARNING FOR CLASSIFICATION PROBLEMS

(71) Applicant: SAP SE, Walldorf (DE)

(72) Inventors: Atreya Biswas, Singapore (SG); Srivatsan Santhanam, Bangalore (IN)

(73) Assignee: SAP SE, Walldorf (DE)

( * ) Notice: Subject to any disclaimer, the term of this patent is extended or adjusted under 35 U.S.C. 154(b) by 788 days.

(21) Appl. No.: 16/669,686

(22) Filed: Oct. 31, 2019

(65) Prior Publication Data
US 2021/0133515 A1      May 6, 2021

(51) Int. Cl.
| | |
|---|---|
| *G06F 3/048* | (2013.01) |
| *G06N 5/025* | (2023.01) |
| *G06Q 10/10* | (2023.01) |
| *G06N 20/10* | (2019.01) |
| *G06F 18/243* | (2023.01) |
| *G06N 5/01* | (2023.01) |

(52) U.S. Cl.
CPC ....... *G06N 5/025* (2013.01); *G06F 18/24323* (2023.01); *G06N 5/01* (2023.01); *G06N 20/10* (2019.01); *G06Q 10/10* (2013.01)

(58) Field of Classification Search
CPC ...... G06F 16/35; G06F 16/285; G06F 16/355; G06F 16/906; G06F 16/55; G06K 9/6282; G06N 5/003; G06N 20/10; G06Q 10/10
See application file for complete search history.

(56) References Cited

U.S. PATENT DOCUMENTS

| | | | | |
|---|---|---|---|---|
| 6,253,169 | B1 * | 6/2001 | Apte | G06F 16/355 |
| | | | | 715/236 |
| 6,519,580 | B1 * | 2/2003 | Johnson | G06K 9/6282 |
| | | | | 707/E17.058 |
| 7,162,413 | B1 * | 1/2007 | Johnson | G06F 16/345 |
| | | | | 706/45 |
| 7,469,240 | B2 * | 12/2008 | Tsukamoto | G06F 16/353 |
| | | | | 707/E17.09 |

(Continued)

OTHER PUBLICATIONS

U.S. Appl. No. 16/552,013, Santhanam et al., filed Aug. 27, 2019.
(Continued)

*Primary Examiner* — Steven B Theriault
(74) *Attorney, Agent, or Firm* — Fish & Richardson P.C.

(57) ABSTRACT

Methods, systems, and computer-readable storage media for receiving historical data, the historical data including variable vectors, each variable vector being assigned to a class, processing the historical data through encoders to provide feature vectors, each feature vector corresponding to a respective variable vector and being assigned to the class of the respective variable vector, generating a set of decision trees based on the feature vectors, each decision tree corresponding to a class in the set of classes, transforming each decision tree into a set of rules to provide sets of rules, each rule in a set of rules defining conditions to assign at least a portion of an electronic document to a respective class in the set of classes, and providing the sets of rules for execution in an enterprise system, the enterprise system classifying electronic documents to classes in the set of classes based on the sets of rules.

20 Claims, 6 Drawing Sheets

| | |
|---|---|
| R1 | IF "outlook" = "overcast" THEN "playtennis" = "yes" |
| R2 | IF "outlook" = "sunny" AND "humidity" = "normal" THEN "playtennis" = "yes" |
| R3 | IF "outlook" = "rainy" AND "windy" = "true" THEN "playtennis" = "no" |

(56) References Cited

U.S. PATENT DOCUMENTS

| | | | |
|---|---|---|---|
| 7,562,308 B2 | 7/2009 | Pradhan et al. | |
| 7,685,087 B2 | 3/2010 | Bae et al. | |
| 8,417,654 B1 | 4/2013 | Cao et al. | |
| 8,788,443 B2 | 7/2014 | Hoffmann | |
| 8,914,370 B2 | 12/2014 | Mishina et al. | |
| 9,298,814 B2* | 3/2016 | Bryars | G06F 16/285 |
| 9,330,127 B2 | 5/2016 | Steinberg et al. | |
| 9,401,884 B2 | 7/2016 | Santhanam et al. | |
| 9,514,414 B1* | 12/2016 | Rosswog | G06N 20/00 |
| 10,657,603 B1* | 5/2020 | Harding | G06F 16/116 |
| 11,250,345 B1* | 2/2022 | Rabbani | G06N 7/005 |
| 11,599,749 B1* | 3/2023 | Ziaeefard | G06N 3/08 |
| 2003/0130993 A1* | 7/2003 | Mendelevitch | G06F 16/353 |
| 2005/0246300 A1* | 11/2005 | Tsukamoto | G06F 16/355 706/46 |
| 2006/0112040 A1* | 5/2006 | Oda | G06F 16/355 707/E17.08 |
| 2008/0163109 A1 | 7/2008 | Srivatsan et al. | |
| 2010/0191734 A1* | 7/2010 | Rajaram | G06F 16/355 707/E17.046 |
| 2011/0035345 A1* | 2/2011 | Duan | G06Q 10/10 706/46 |
| 2011/0188759 A1* | 8/2011 | Filimonova | G06F 16/93 382/195 |
| 2011/0249905 A1* | 10/2011 | Singh | G06V 30/412 382/225 |
| 2011/0302171 A1* | 12/2011 | Waldo | G06F 16/93 707/E17.014 |
| 2013/0035929 A1* | 2/2013 | Okamoto | G06Q 10/10 704/9 |
| 2013/0138428 A1* | 5/2013 | Chandramouli | G06F 40/30 704/9 |
| 2013/0262417 A1 | 10/2013 | Zhou et al. | |
| 2014/0025608 A1* | 1/2014 | Miller | G06N 20/20 706/12 |
| 2014/0156567 A1* | 6/2014 | Scholtes | G06N 5/02 706/12 |
| 2017/0060986 A1* | 3/2017 | Ideses | G06F 16/93 |
| 2017/0277668 A1* | 9/2017 | Luo | G06F 16/345 |
| 2018/0018587 A1* | 1/2018 | Kobayashi | G06N 5/04 |
| 2018/0349388 A1* | 12/2018 | Skiles | G06F 16/358 |
| 2019/0164060 A1* | 5/2019 | Gulin | G06F 16/9027 |
| 2019/0197141 A1* | 6/2019 | Gomez | G06F 16/2246 |
| 2020/0005047 A1* | 1/2020 | Polatkan | G06V 10/764 |
| 2020/0012728 A1* | 1/2020 | Jan | G06N 20/00 |
| 2020/0117718 A1* | 4/2020 | Lundberg | G06N 3/084 |
| 2020/0320438 A1* | 10/2020 | Lin | G06N 20/20 |
| 2021/0064866 A1* | 3/2021 | Rezvani | G06N 20/00 |
| 2021/0090694 A1* | 3/2021 | Colley | G16B 40/00 |
| 2021/0133515 A1* | 5/2021 | Biswas | G06K 9/6282 |

OTHER PUBLICATIONS

U.S. Appl. No. 16/430,674, Byiringiro et al., filed Jun. 4, 2019.
Storkey, "Learning From Data: Decision Trees" Created on Sep. 1, 2004, [Retrieved on Oct. 2, 2019], retrieved from : URL <http://homepages.inf.ed.ac.uk/amos/lfd/lectures/decisiontree.pdf>, 23 pages.
Littmann, "Decision Tree Learning" created on Sep. 13, 2004, [Retrieved on Oct. 2, 2019], retrieved from : URL <https://www.cs.rutgers.edu/~mlittman/courses/ml04/ch3.pdf>, 10 pages.
Roth, "Decision Trees" Created on Sep. 8, 2016, [Retrieved on Oct. 30, 2019], retrieved from : URL <http://l2r.cs.uiuc.edu/Teaching/CS446-17/LectureNotesNew/dtree/main.pdf>, 15 pages.
Batista et al., "Text based classification of companies in CrunchBase." 2015 IEEE International Conference on Fuzzy Systems (FUZZ-IEEE), Aug. 2015, 7 pages.
Extended European Search Report issued in European Application No. 20202977.3 dated May 18, 2021, 11 pages.
Jiawei et al., "Chapter 6 : Classification and Prediction" In Data Mining, Concepts and Techniques, 2nd edition, Mar. 2006, 285-382, 98 pages.
Sheng et al., "Learning rules for Chinese prosodic phrase prediction." Proceedings of the first SIGHAN workshop on Chinese language processing-vol. 18, Sep. 2002, 7 pages.
Sibaroni et al., "Extend relation identification in scientific papers based on supervised machine learning." 2016 International Conference on Advanced Computer Science and Information Systems, IEEE, Oct. 2016, 6 pages.

* cited by examiner

| R1 | IF "outlook" = "overcast" THEN "playtennis" = "yes" |
| R2 | IF "outlook" = "sunny" AND "humidity" = "normal" THEN "playtennis" = "yes" |
| R3 | IF "outlook" = "rainy" AND "windy" = "true" THEN "playtennis" = "no" |

AUTOMATED RULE GENERATION FRAMEWORK USING MACHINE LEARNING FOR CLASSIFICATION PROBLEMS

BACKGROUND

Over the last several years, a trend in enterprise operations has been towards so-called intelligent enterprises, which includes automating mundane tasks. Automation has been achieved using machine-learning (ML) and/or rule-based systems. In ML scenarios, ML models are black boxes where the reasons for the decisions are not always transparent. Consequently, there is a need to verify the output of the ML models as part of acceptance testing in order to trust the ML models. In intelligent enterprises, rule-based systems excel over ML models, because the rules are more readily verifiable and are trusted more than ML models. In many scenarios, truth labels frequently change, which creates difficulties in training the ML models until a considerable amount of data has been accumulated. In contrast, in rule-based systems, the truth can be readily adapted. However, creating and maintaining rules is cumbersome and expensive and requires a significant level of domain expertise.

SUMMARY

Implementations of the present disclosure provide a rule generation platform that applies machine-learning (ML) to automatically generate a set of rules. More particularly, implementations of the present disclosure are directed to a rule generation platform that processes structured data (e.g., tabular data) using one or more ML models to provide a set of decision trees, and that transforms decision trees in the set of decision trees to provide a set of rules.

In some implementations, actions include receiving historical data, the historical data including a set of variable vectors, each variable vector being assigned to a class in a set of classes, processing the historical data through one or more encoders to provide a set of feature vectors, each feature vector corresponding to a respective variable vector in the set of variable vectors and being assigned to the class of the respective variable vector, generating a set of decision trees based on the feature vectors, each decision tree corresponding to a class in the set of classes, transforming each decision tree into a set of rules to provide sets of rules, each rule in a set of rules defining conditions to assign at least a portion of an electronic document to a respective class in the set of classes, and providing the sets of rules for execution in an enterprise system, the enterprise system classifying electronic documents to classes in the set of classes based on the sets of rules. Other implementations of this aspect include corresponding systems, apparatus, and computer programs, configured to perform the actions of the methods, encoded on computer storage devices.

These and other implementations can each optionally include one or more of the following features: processing the historical data through one or more encoders to provide a set of feature vectors includes one or more of: transforming categorical variables into bit-strings using a categorical binary encoder, and converting text variables into variables of top q tokens using a count vectorizer; during processing of the historical data, numerical values remain unchanged between a variable vector and a respective feature vector; transforming each decision tree into a set of rules includes transforming decision tree branches with numeric variables into a rule condition with a respective comparison operators selected from a set consisting of less than (<), greater than (>), less than or equal to (<=), greater than or equal to (>=), equal to (==), and not equal to (!=); transforming each decision tree into a set of rules includes transforming decision tree branches with categorical variables into a rule condition with equal to (==); transforming each decision tree into a set of rules includes transforming decision tree branches containing a text variable into a rule condition using a contains operator ($\subset$); and the electronic documents include bank statements and the classes include accounts.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure provide a rule generation platform that applies machine-learning (ML) to automatically generate a set of rules. More particularly, implementations of the present disclosure are directed to a rule generation platform that processes structured data (e.g., tabular data) using one or more ML models to provide a set of decision trees, and that transforms decision trees in the set of decision trees to provide a set of rules. Implementations can include actions of receiving historical data, the historical data including a set of variable vectors, each variable vector being assigned to a class in a set of classes, processing the historical data through one or more encoders to provide a set of feature vectors, each feature vector corresponding to a respective variable vector in the set of variable vectors and being assigned to the class of the respective variable vector, generating a set of decision trees based on the feature vectors, each decision tree corresponding to a class in the set of classes, transforming each decision tree into a set of rules to provide sets of rules, each rule in a set of rules defining conditions to assign at least a portion of an electronic document to a respective class in the set of classes, and providing the sets of rules for execution in an enterprise system, the enterprise system classifying electronic documents to classes in the set of classes based on the sets of rules.

To provide further context for implementations of the present disclosure, and as introduced above, over the last several years, a trend in enterprise operations has been towards so-called intelligent enterprises, which includes automating mundane tasks. Automation has been achieved using ML and/or rule-based systems. In ML scenarios, ML models are black boxes where the reasons for the decisions are not always transparent. Consequently, there is a need to verify the output of the ML models as part of acceptance testing in order to trust the ML models. In such scenarios, rule-based systems excel over ML models, because the rules are more readily verifiable and enjoy more trust than ML models. In many scenarios, truth labels frequently change, which creates difficulties in training the ML models until a considerable amount of data has been accumulated. In contrast, in rule-based systems, the truth can be readily adapted. However, creating and maintaining rules is cumbersome and expensive and requires a significant level of domain expertise.

In view of the above context, implementations of the present disclosure provide a rule generation platform that applies ML to automatically generate a set of rules. More particularly, implementations of the present disclosure are directed to a rule generation platform that processes structured data (e.g., tabular data) using one or more ML models to provide a set of decision trees, and that transforms decision trees in the set of decision trees to provide a set of rules. In some examples, rules in the set of rules are used to execute one or more enterprise operations. In some examples, each rule is provided as a human-readable rule in the form of "if condition then predict class." In some implementations, comprehensible rules are generated even in domains where noise is present. Noise can include, for example, instances where groundtruth data has errors.

As described in further detail herein, the rule generation platform of the present disclosure receives structured data. In some examples, the structured data is provided as tabular data represented as $T_{ij}$, where i is the number of rows, and m is the number of variables v (e.g., m=j−1). In some examples, each variable v is of a type, example types including, without limitation, category, numeric, text, and target. In some examples, target indicates a target variable y, which is provided as a class C, and n is the number of classes. In some implementations, the tabular data is transformed into a feature vector $F_{ik}$. In some examples, a set of encoders transform the variable vectors to the feature vectors. For example, a variable within a variable vector is transformed based on a respective type, as described in further detail herein. Each feature vector is processed through a classifier, also described in further detail herein, which results in n decision trees. For example, a decision tree is provided for each class. Each decision tree is associated with classification metrics. Example classification metrics include, without limitation, accuracy, and area under receiver operating characteristic (ROC) curve. Each decision tree is transformed into a rule set that includes one or more rules. Each rule set is associated with the classification metrics provided for the respective decision tree. The rule sets can be used to execute one or more enterprise operations, as described in further detail herein.

Implementations of the present disclosure are described in further detail with reference to an example problem space that includes general ledgers (G/L), and specifically to matching line items of banks statements (BSs) (e.g., received as computer-processable electronic documents) to a G/L account within a set of G/L accounts. In the example problem space, each G/L account is a class, and each set of rules is provided for a specific G/L account. It is contemplated that implementations of the present disclosure can be realized in any appropriate problem space.

Figure 1:
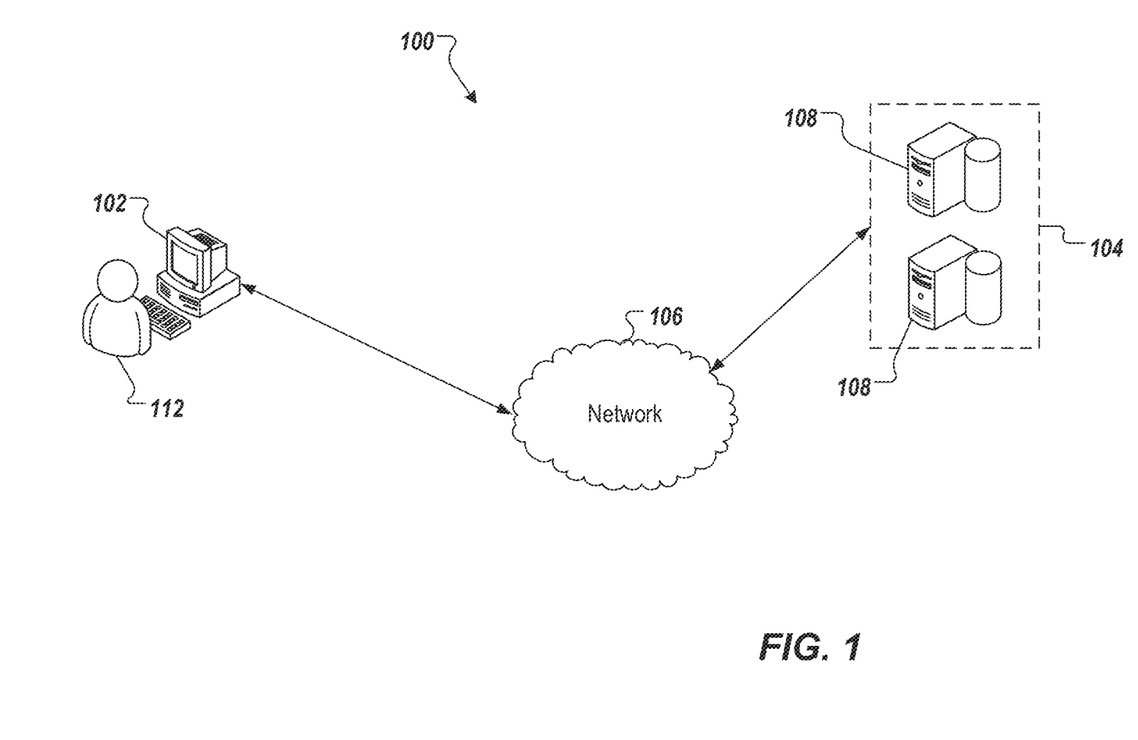
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a rule generation platform that applies ML to automatically generate sets of rules. In some implementations, the rule generation platform processes structured data (e.g., tabular data) using one or more ML models to provide a set of decision trees and transforms decision trees in the set of decision trees to provide sets of rules. In some examples, rules in the sets of rules are used to execute one or more enterprise operations. For example, the server system 104 (and/or another server system) can host enterprise software that executes enterprise operations. The enterprise software can use the sets of rules to execute the enterprise operations.

Figure 2:
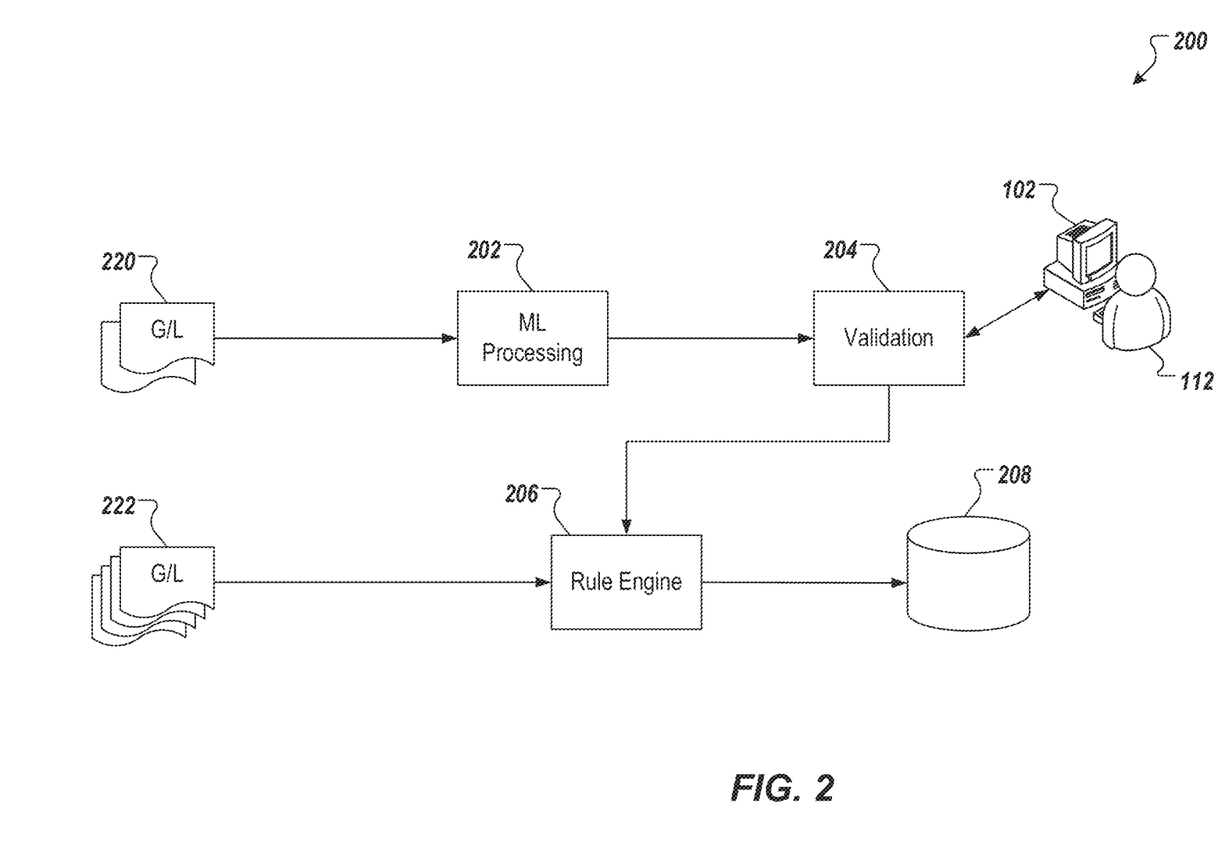
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes an ML processing module 202, a validation module 204, a rule engine 206, and a datastore 208. In accordance with implementations of the present disclosure, the ML processing module 220 processes historical data 220 to provide a set of rules. In the example context, the historical data 220 can include a set of BSs and, for each line item in a BS, a G/L account that the line item in the BS had been assigned to. In some examples, the historical data 220 is provided as structured data (e.g., tabular data) that is processed by the ML processing module 202 to provide a set of decision trees.

The decision trees are further processed by the ML processing module 202 to provide sets of rules, each set of rules corresponding to a respective decision tree and including one or more rules. As described herein, each rule is provided as a human-readable rule in the form of "if condition then predict class." In the example problem space, and as discussed above, each G/L account is considered a class. Consequently, each rule is provided in the form of "if condition then G/L account." In some examples, the sets of rules are provided to the validation module 204 for validation. For example, the user 112 can interact with the validation module 204 through the computing device 102 to validate the rules. For example, the user 112 can be a domain expert that can review and approve, deny, or edit the automatically generated rules. In some examples, the user 112 can approve a rule without changes. In some examples, the user 112 can revise a rule and/or delete a rule as part of the validation.

In some implementations, after validation, the sets of rules are provided to the rule engine 206. In some examples, the rule engine 206 is provided as part of an enterprise software system that executes one or more enterprise operations. For example, the rule engine 206 can receive electronic documents 222 and process the electronic documents 222 based on the sets of rules to match the electronic documents to a class (e.g., a G/L account). In the example context, the electronic documents 222 can represent BSs and the rule engine 206 processes the BSs based on the sets of rules to match each BS to a respective G/L account. In some examples, matches are stored in the datastore 208 for further processing (e.g., clearing paid invoices).

Figure 3:
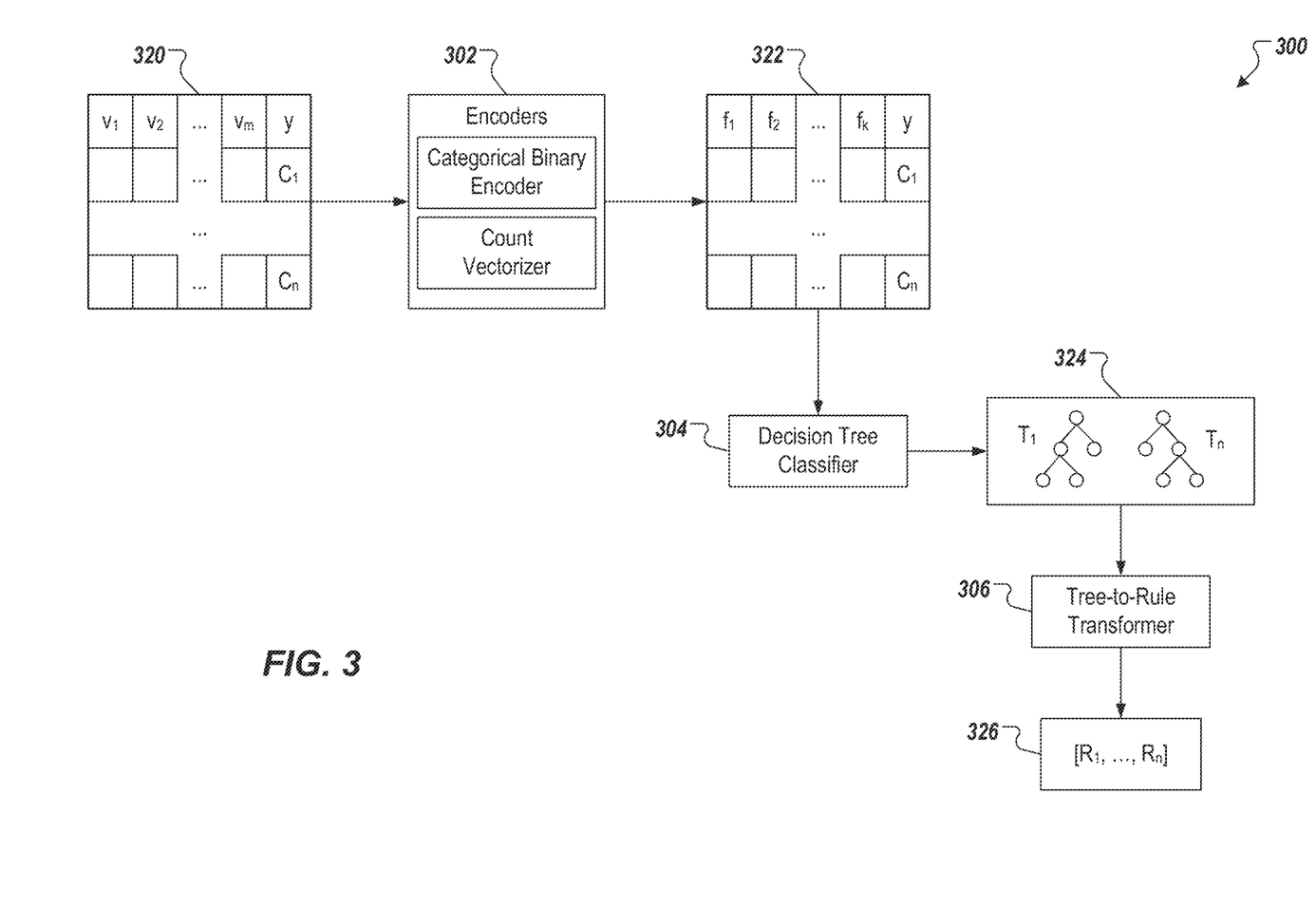
FIG. 3 is a conceptual diagram depicting implementations of the present disclosure.

FIG. 3 is an example conceptual diagram 300 depicting implementations of the present disclosure. The example conceptual diagram 300 includes encoders 302, a decision tree classifier 304, and a tree-to-rule transformer 306. The encoders receive historical data 320, which is provided as tabular data. The historical data 320 includes a set of variable vectors $\mathbb{V}$ including variable vectors $V_1, \ldots V_n$, and each vector V includes a set of variables $v_1, \ldots, v_m$. Further, each variable vector V is associated with a target variable y that indicates a respective class C in a set of classes $C_1, \ldots C_n$ that is assigned to the variable vector V. In the example context, each variable vector V represents a line item of a BS and each class C represents a G/L account, to which the line item in the BS has been assigned. In the example context, example variables v can include, without limitation, BS identifier, bank identifier, bank account, debit/credit code, reference number, memo line, currency, cost center code, and tax code.

In some implementations, the historical data 320 is processed by the encoders 302 to provide feature data 322, also provided as tabular data. The feature data 322 includes a set of feature vectors $\mathbb{F}$ including feature vectors $F_1, \ldots F_n$, and each feature vector F includes a set of values $f_1, \ldots, f_k$. Further, each feature vector F is associated with a target variable y that indicates a respective class C in a set of classes $C_1, \ldots C_n$ that is assigned to the value vector V that corresponds to the respective feature vector F. In the example context, each feature vector F represents a value or a transformed value of a line item of a BS and each class C represents a G/L account, to which the BS has been assigned.

In further detail, the variable types of a structured tabular data can be summarized into the following types: numerical, categorical, and text. In some examples, numerical values are not treated in any special way through the encoders 302. That is, numerical values from a variable vector V are unchanged in the corresponding feature vector F. Because decision trees are invariant to monotonic transformations of the variables, there is no need to normalize the numeric input data.

In some examples, and as described in further detail herein, processing of the set of feature vectors is performed by the Classification and Regression Tree (CART) decision tree algorithm, which cannot handle categorical variables. In view of this, the encoders 302 include a categorical binary encoder to transform categorical variables provided in the historical data 320. Binary encoding for categorical variables is similar to one-hot encoding. However, binary encoding is stored as binary bit-strings. This encodes the data in fewer dimensions than one-hot encoding, which reduces data sparsity.

With regard to binary encoding, and by way of non-limiting example, a categorical column called "HouseBankAccount" can be provided, which has 100 categories ranging from DEAC1, DEAC2, ..., DEAC101. Applying one-hot encoding to the HouseBankAccount column results in 100 columns (e.g., HouseBankAccount=DEAC1, HouseBankAccount=DEAC2, . . . ., HouseBankAccount=DEAC101) populated with 1 for that HouseBankAccount value and the remainder populated with 0. This results in high dimensionality and sparseness of the feature set. In order to overcome this, binary encoding is used, in which integers are assigned to categories using ordinal encoding (e.g., 0 to 100). Continuing with the non-limiting example above, 7 columns can be used to represent the 100 columns (e.g., $2^7=128$). In this example, 10 is represented as 0001010, which refers to HouseBankAccount category DEAC1, and 100 is represented as 1100100, which refers to HouseBankAccount Category DEAC101. Consequently, instead of 100 columns from one-hot encoding, binary encoding results in 7 columns.

Text variables are converted into variables of top q tokens, where q is used as a hyper-parameter by the framework to improve accuracy on the hold out dataset. More particularly, the encoders 302 include a count vectorizer, which is used to determine the top q tokens. In the example context, text data can include text provided in the memolines of the BS. The count vectorizer counts occurrences of each word (token) across all memolines provided in the historical data 320 and can return the top q tokens (e.g., the top 20 words appearing across all memolines). In short, for each word appearing in a memoline, the count vectorizer counts the number of times the word appears across all memolines in the historical data 320.

For text processing, implementations of the present disclosure include an automation-based framework which can process tokens (e.g., words) faster in parallel, with an extensible framework where additional skills can be added on usage, a low-power processing model. A difference to existing NLP frameworks is that existing NLP frameworks works decipher embodied learning, synthesize statements, decipher innate biases and work on the natural language understanding. In contrast, the text processing of the present disclosure lays emphasis on key tokens, its occurrences normalized over data set and metric "implication" with other feature dimensions making it more relevant to the table structure being processed.

With regard to the implication metric and example is provided based on the following example table:

TABLE 1

Sample Vendor Posting

| Vendor ID | Vendor Name | Address | Fee Posted | Payment Time | Outstanding | Comments |
|---|---|---|---|---|---|---|
| 1000098765 | Keev Enterprises | 1, Woodway, Austin, | $95000 | 90 | $200765 | Keev outstanding payment done |

Here, in the free text Comments, the tokens "Keev," "outstanding," and "payment" would have a relatively higher implication score as compared to the token "done." Within these three tokens, "Keev" would have a higher implication score followed by "outstanding" and "payment," have the same implication score. In some examples, the implication score is calculated as a variant of inverse document frequency (IDF). More particularly, apart from giving weight to sparsely used words, a specific look-up for data dictionary (DDIC) is performed. In some systems, a table is made up of data elements and domains which gives the columns in a table a semantic importance. In the above example, "Keev" can potentially be a vendor name that has a higher implication score compared with the "done" token. This is also the case for the token "payment," which has a higher implication score, because it corresponds to the semantics of column "Payment Time."

In some examples, a skill can be added based on need by a user. An example skill includes, without limitation, synonym enrichment. For example, and with reference to the example of Table 1 above, synonyms for "payment" can be determined to provide "cash," "premium," "fee," and "amount," for example. Using synonyms ensures that the implication metric accounts for use of alternate words. Another example of skill is checking words with standard data services. For example, a business partner name can be cross-referenced with a standard data service, such as Dun & Bradstreet, which provides a D-U-N-S number that can be used in determining the implication score. In this example, the implication score for the business partner name would also account for the D-U-N-S number that may also appear for that business partner.

In some implementations, the feature data 322 is provided as input to a decision tree classifier 304. An example decision tree classifier 304 includes, without limitation, the CART decision tree algorithm introduced above. In some implementations, the decision tree classifier 304 processes the feature data 322 in a one-vs-rest manner per class (e.g., per G/L account). That is, a decision tree is provided for each class (e.g., for each G/L account). In the example of FIG. 3, the decision tree classifier 304 provides a set of decision trees $T_1, \ldots, T_n$. In developing the decision trees, the decision tree classifier 304 breaks down the feature data 322 into smaller and smaller subsets as an associated decision tree is incrementally developed. The resulting decision trees each include a root node, decision nodes, and leaf nodes, each leaf node representing a class. The following example pseudocode illustrates how CART provides decisions trees from the tabular data:

Inputs:
    Decision Tree (CART) Classifier—C
    Samples—$X_n$
    Number of samples—n
    Labels Y where $y_j Î \{1, \ldots, k\}$ and is the label of $X_j$ Procedure:
    for each label, i to k:
      for each line item j to n:
        If $y_j=1$ then $y_j:=1$ else $y_j:=0$
      $f_i:=$generateFeatures($X_n, Y_n$)
      $d_i:=$trainCARTBinaryClassifier($f_i$)
Result:
    $d_k$: k Decision trees.

Example Pseudocode to Generate Decision Trees

In some implementations, each decision tree in the set of decision trees 324 is processed by the tree-to-rule transformer 306 to provide sets of rules $R_1, \ldots R_n$ 326, each set of rules R corresponding to a respective class (e.g., G/L account) and including one or more rules r. In further detail, for each decision tree T, decision tree branches with numeric variables are transformed into a rule condition with a respective comparison operators. Example comparison operators include, without limitation, less than ($<$), greater than ($>$), less than or equal to ($<=$), greater than or equal to ($>=$), equal to ($==$), and not equal to ($!=$). In some examples, decision tree branches with categorical variables are transformed into a rule condition with equal to ($==$). In some examples, for decision tree branches containing a text variable, the branch is transformed into a rule condition using a contains operator ($\subset$).

Figure 4A:
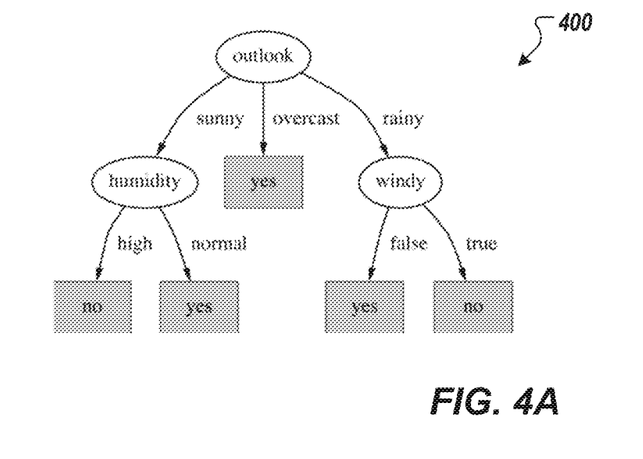
FIGS. 4A and 4B depict example rule generation from decision trees.
Figure 4B:
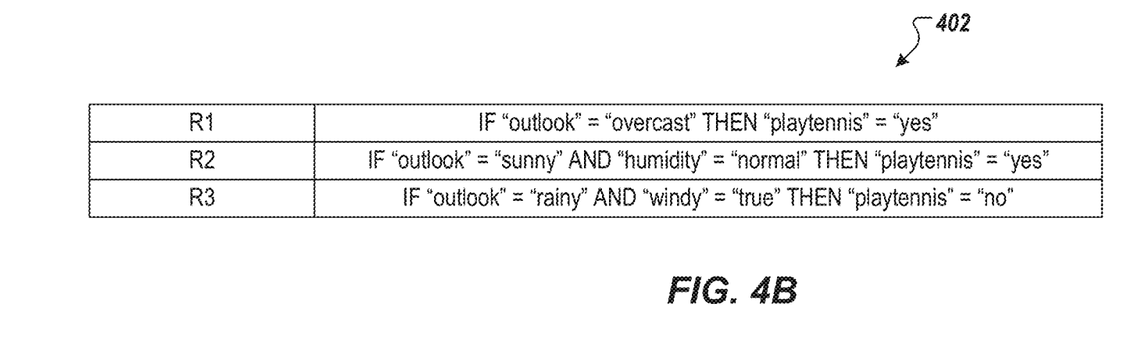

FIGS. 4A and 4B depict example rule generation from decision trees. FIG. 4A depicts an example decision tree 400 for an example data set. The example data set is a well-publicized "Play Tennis" dataset that is known in the art, and the example decision tree 400 can be provided from the dataset. The example decision tree 400 can be processed to provide an example set of rules 402 depicted in FIG. 4B. It is appreciated that the rules provided in the set of rules 402 are not exhaustive of the rules that can be provided from the example decision tree 400.

As described herein, implementations of the present disclosure provide a set of rules for each class (e.g., each G/L account). Each set of rules includes one or more rules to classify an electronic document (e.g., bank statement) to the respective class. In the example problem space, examples of sets of rules can be provided as:
IF Memoline:Contains:Charges IS FALSE AND
Memoline:Contains:Garage   IS   TRUE   AND
HouseBank==DEBK2 IS TRUE
THEN GLAccount=71000000 [[0. 12.]]

Accuracy—100.0%
Confusion Matrix
[[259 0]
 [0 38]]

Example Set of Rules for First G/L Account (GL Account #71000000)

IF Memoline:Contains:2018 IS TRUE AND PaymentExternalTransacType
==53 IS TRUE THEN GLAccount=29131000 [[0. 12.]]
Accuracy—100.0%
Confusion Matrix
[[285 0]
 [0 12]]

Example Set of Rules for Second G/L Account (GL Account #29131000)

In some examples, the confusion matrix can be used to determine classification metrics (e.g., Accuracy, Recall, F1-Score), which represent the performance of the rule. In this manner, a user can decide whether to accept the rule.

Figure 5:
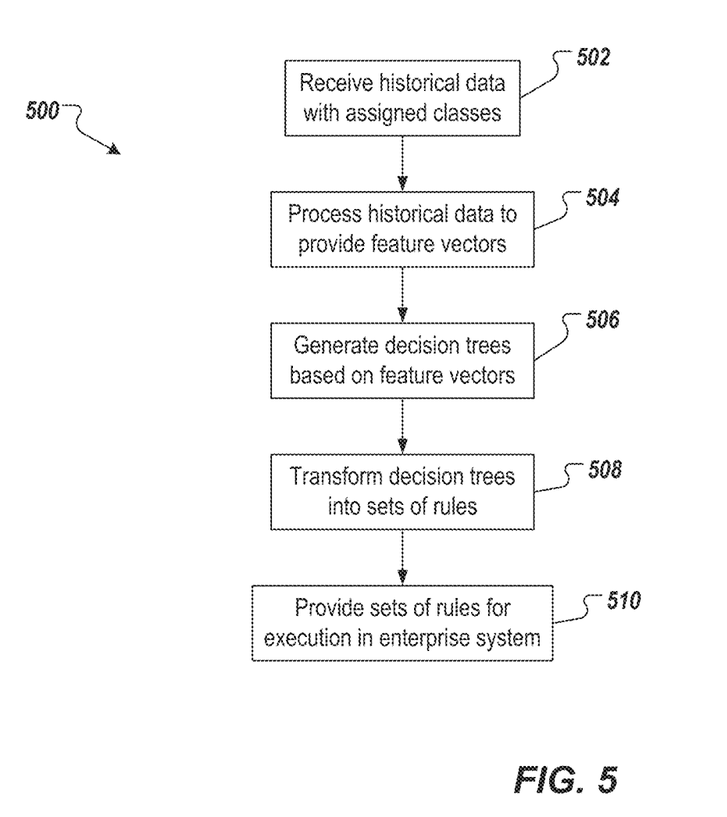
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Historical data including assigned classes is received (502). For example, and as described in detail herein, a dataset including structured data (e.g., tabular data) is received, the dataset including variable vectors. Each variable vector includes one or more variables and values therefor and is assigned to a respective class. For example, and in the example context, each variable vector represents a respective BS and the class assigned to a variable vector is a G/L account that the BS has been matched to. The historical data is processed to provide feature vectors (504). For example, and as described herein, each variable vector is processed to transform the variable value, if needed. For example, numerical values remain unchanged and are provided directly in the corresponding feature vector as is. As another example, a categorical binary encoder is used to transform categorical variables into bit-strings and the bit-strings are provided in the corresponding feature vector. As another example, a count vectorizer converts text variables into variables of top k tokens, as described herein.

A set of decision trees is generated based on the feature vectors (506). For example, and as described herein, a decision tree algorithm (e.g., CART) processes the feature vectors to generate the set of decision trees. In some examples, each decision tree in the set of decision trees corresponds to a respective class. Each decision tree is transformed into a set of rules (508). For example, and as described herein, each path in a decision tree from the root node to a leaf node is transformed to provide a rule, the rule indicating whether the path leads to assignment of the respective class. As described herein, decision tree branches with numeric variables are transformed into a rule condition with a respective comparison operators. Example comparison operators include, without limitation, less than (<), greater than (>), less than or equal to (<=), greater than or equal to (>=), equal to (==), and not equal to (!=). In some examples, decision tree branches with categorical variables are transformed into a rule condition with equal to (==). In some examples, for decision tree branches containing a text variable, the branch is transformed into a rule condition using a contains operator ($\subset$). In some examples, each rule in the set of rules is a positive result for assignment of the respective class. That is, each rule in the set of rules, if the respective conditions are met, would result in assignment of the respective class to the document being analyzed.

The sets of rules are provided for execution in an enterprise system (510). For example, the enterprise system can incorporate or otherwise reference the sets of rules in performing functionality. In some examples, the enterprise system receives an electronic document (e.g., a BS) and analyzes values of the electronic document in view of each rule in a set of rules. If the electronic document meets all of the conditions of a set of rules, the electronic document is assigned to the class (e.g., G/L account) that corresponds to the set of rules. If the electronic document does not meet all of the conditions of the set of rules, the electronic document is analyzed in view of each rule in another set of rules corresponding to another class.

Figure 6:
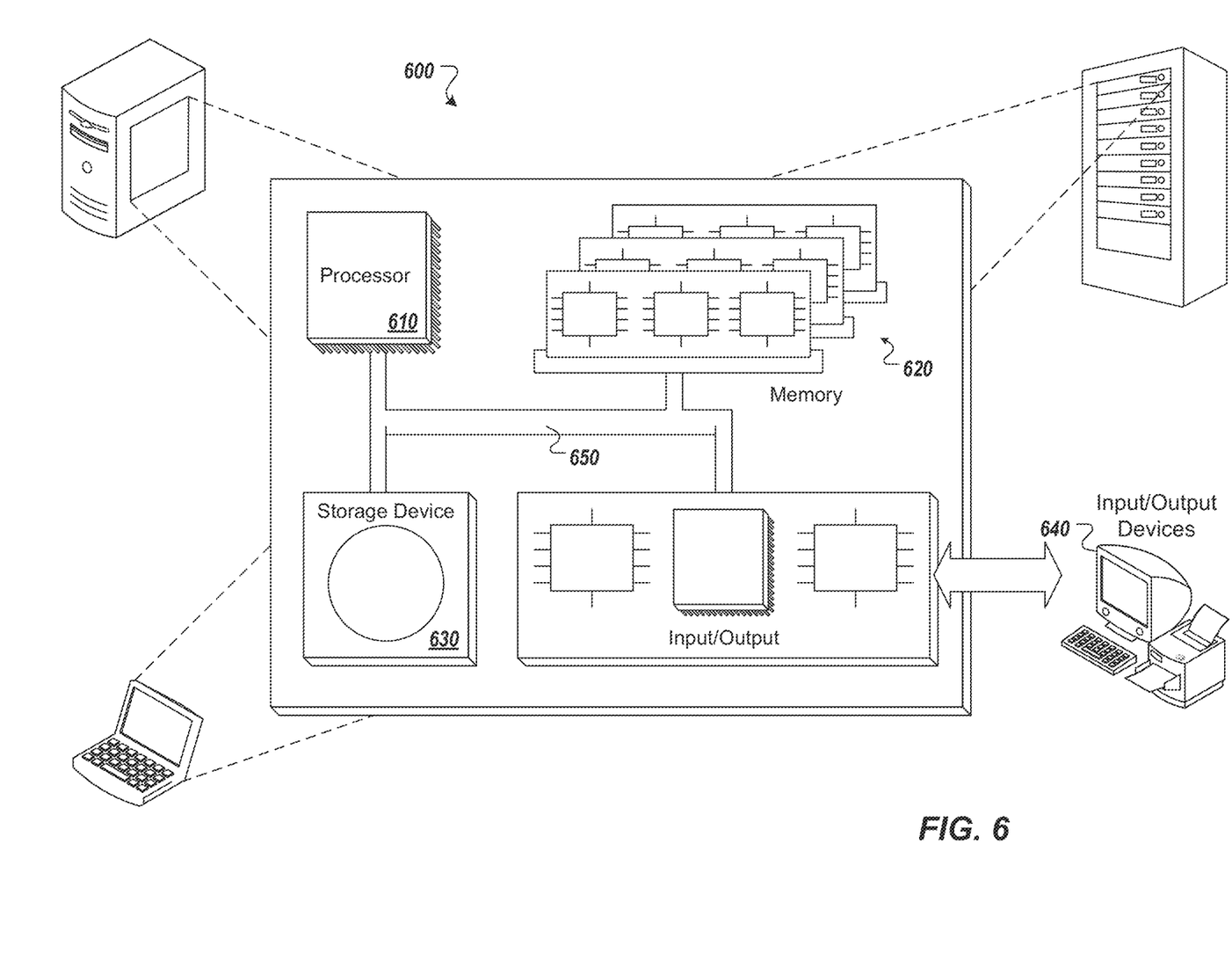
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automated provision of sets of rules using machine learning (ML) models, the method being executed by one or more processors and comprising:
   receiving historical data, the historical data comprising a set of variable vectors, each variable vector being assigned to a class in a set of classes;
   processing the historical data through one or more encoders to provide a set of feature vectors, each feature vector corresponding to a respective variable vector in the set of variable vectors and being assigned to the class of the respective variable vector;
   generating a set of decision trees based on the feature vectors, the set of decision trees comprising a first decision tree corresponding to a first class in the set of classes and a second decision tree corresponding to a second class in the set of classes;
   transforming the first decision tree into a first set of rules and the second decision tree into a second set of rules to provide sets of rules comprising the first set of rules and the second set of rules, each rule in the first set of rules defining one or more if conditions to selectively assign at least a portion of an electronic document to the first class, and each rule in the second set of rules defining one or more if conditions to selectively assign the at least a portion of the electronic document to the second class; and
   providing the sets of rules for execution in an enterprise system, the enterprise system classifying electronic documents to classes in the set of classes based on the sets of rules.

2. The method of claim 1, wherein processing the historical data through one or more encoders to provide a set of feature vectors comprises one or more of:
   transforming categorical variables into bit-strings using a categorical binary encoder; and
   converting text variables into variables of top q tokens using a count vectorizer.

3. The method of claim 1, wherein during processing of the historical data, numerical values remain unchanged between a variable vector and a respective feature vector.

4. The method of claim 1, wherein transforming each decision tree into a set of rules comprises, transforming decision tree branches with numeric variables into a rule condition with a respective comparison operators selected from a set consisting of less than (<), greater than (>), less than or equal to (<=), greater than or equal to (>=), equal to (==), and not equal to (!=).

5. The method of claim 1, wherein transforming each decision tree into a set of rules comprises, transforming decision tree branches with categorical variables into a rule condition with equal to (==).

6. The method of claim 1, wherein transforming each decision tree into a set of rules comprises, transforming decision tree branches containing a text variable into a rule condition using a contains operator ($\subset$).

7. The method of claim 1, wherein the electronic documents comprise bank statements and the classes comprise accounts.

8. A non-transitory computer-readable storage medium coupled to one or more processors and having instructions stored thereon which, when executed by the one or more processors, cause the one or more processors to perform operations for automated provision of sets of rules using machine learning (ML) models, the operations comprising:

receiving historical data, the historical data comprising a set of variable vectors, each variable vector being assigned to a class in a set of classes;

processing the historical data through one or more encoders to provide a set of feature vectors, each feature vector corresponding to a respective variable vector in the set of variable vectors and being assigned to the class of the respective variable vector;

generating a set of decision trees based on the feature vectors, the set of decision trees comprising a first decision tree corresponding to a first class in the set of classes and a second decision tree corresponding to a second class in the set of classes;

transforming the first decision tree into a first set of rules and the second decision tree into a second set of rules to provide sets of rules comprising the first set of rules and the second set of rules, each rule in the first set of rules defining one or more if conditions to selectively assign at least a portion of an electronic document to the first class, and each rule in the second set of rules defining one or more if conditions to selectively assign the at least a portion of the electronic document to the second class; and providing the sets of rules for execution in an enterprise system, the enterprise system classifying electronic documents to classes in the set of classes based on the sets of rules.

9. The computer-readable storage medium of claim 8, wherein processing the historical data through one or more encoders to provide a set of feature vectors comprises one or more of:

transforming categorical variables into bit-strings using a categorical binary encoder; and converting text variables into variables of top q tokens using a count vectorizer.

10. The computer-readable storage medium of claim 8, wherein during processing of the historical data, numerical values remain unchanged between a variable vector and a respective feature vector.

11. The computer-readable storage medium of claim 8, wherein transforming each decision tree into a set of rules comprises, transforming decision tree branches with numeric variables into a rule condition with a respective comparison operators selected from a set consisting of less than (<), greater than (>), less than or equal to (<=), greater than or equal to (>=), equal to (==), and not equal to (!=).

12. The computer-readable storage medium of claim 8, wherein transforming each decision tree into a set of rules comprises, transforming decision tree branches with categorical variables into a rule condition with equal to (==).

13. The computer-readable storage medium of claim 8, wherein transforming each decision tree into a set of rules comprises, transforming decision tree branches containing a text variable into a rule condition using a contains operator ($\subset$).

14. The computer-readable storage medium of claim 8, wherein the electronic documents comprise bank statements and the classes comprise accounts.

15. A system, comprising:
a computing device; and
a computer-readable storage device coupled to the computing device and having instructions stored thereon which, when executed by the computing device, cause the computing device to perform operations for natural language explanations for automated provision of sets of rules using machine learning (ML) models, the operations comprising:

receiving historical data, the historical data comprising a set of variable vectors, each variable vector being assigned to a class in a set of classes;

processing the historical data through one or more encoders to provide a set of feature vectors, each feature vector corresponding to a respective variable vector in the set of variable vectors and being assigned to the class of the respective variable vector;

generating a set of decision trees based on the feature vectors, the set of decision trees comprising a first decision tree corresponding to a first class in the set of classes and a second decision tree corresponding to a second class in the set of classes;

transforming the first decision tree into a first set of rules and the second decision tree into a second set of rules to provide sets of rules comprising the first set of rules and the second set of rules, each rule in the first set of rules defining one or more if conditions to selectively assign at least a portion of an electronic document to the first class, and each rule in the second set of rules defining one or more if conditions to selectively assign the at least a portion of the electronic document to the second class; and providing the sets of rules for execution in an enterprise system, the enterprise system classifying electronic documents to classes in the set of classes based on the sets of rules.

16. The system of claim 15, wherein processing the historical data through one or more encoders to provide a set of feature vectors comprises one or more of:

transforming categorical variables into bit-strings using a categorical binary encoder; and converting text variables into variables of top q tokens using a count vectorizer.

17. The system of claim 15, wherein during processing of the historical data, numerical values remain unchanged between a variable vector and a respective feature vector.

18. The system of claim 15, wherein transforming each decision tree into a set of rules comprises, transforming decision tree branches with numeric variables into a rule condition with a respective comparison operators selected from a set consisting of less than (<), greater than (>), less than or equal to (<=), greater than or equal to (>=), equal to (==), and not equal to (!=).

19. The system of claim 15, wherein transforming each decision tree into a set of rules comprises, transforming decision tree branches with categorical variables into a rule condition with equal to (==).

20. The system of claim 15, wherein transforming each decision tree into a set of rules comprises, transforming decision tree branches containing a text variable into a rule condition using a contains operator ($\subset$).

* * * * *